US012698875B1

(12) United States Patent
Qu

(10) Patent No.: US 12,698,875 B1
(45) Date of Patent: Aug. 4, 2026

(54) FIRECRACKER-SHAPED LIGHT STRING

(71) Applicant: Haixia Qu, Taizhou (CN)

(72) Inventor: Haixia Qu, Taizhou (CN)

(73) Assignee: Haixia Qu, Taizhou (CN)

( * ) Notice: Subject to any disclaimer, the term of this patent is extended or adjusted under 35 U.S.C. 154(b) by 0 days.

(21) Appl. No.: 19/246,597

(22) Filed: Jun. 23, 2025

(30) Foreign Application Priority Data

May 19, 2025 (CN) ......................... 202520979644.3

(51) Int. Cl.

| | |
|---|---|
| ***F21S 4/10*** | (2016.01) |
| ***F21V 23/00*** | (2015.01) |
| ***F21V 23/06*** | (2006.01) |
| ***F21V 31/00*** | (2006.01) |
| ***F21Y 113/20*** | (2016.01) |
| ***F21Y 115/10*** | (2016.01) |
| ***H05B 47/155*** | (2020.01) |
| ***H05B 47/17*** | (2020.01) |

(52) U.S. Cl.
CPC .............. *F21S 4/10* (2016.01); *F21V 23/001* (2013.01); *F21V 23/008* (2013.01); *F21V 23/06* (2013.01); *F21V 31/005* (2013.01); *H05B 47/155* (2020.01); *H05B 47/17* (2020.01); *F21Y 2113/20* (2016.08); *F21Y 2115/10* (2016.08)

(58) Field of Classification Search
CPC .......... F21S 4/10; F21V 23/001; F21V 23/06; F21V 23/008; F21V 31/005; F21Y 2105/12; F21Y 2113/00; F21Y 2113/20; F21W 2121/006; F21W 2121/008; F21W 2121/04; H05B 47/155; H05B 47/17
See application file for complete search history.

(56) References Cited

U.S. PATENT DOCUMENTS 3,723,723 A * 3/1973 Lerner ...................... F21S 4/10 362/124
11,221,130 B1 * 1/2022 Tsai ...................... F21V 23/001
2002/0097577 A1 * 7/2002 Huang ................ F21V 21/0824 362/240
2009/0085487 A1 * 4/2009 Braasch .................... F21S 4/10 315/185 S
2017/0108185 A1 * 4/2017 He ............................ F21V 3/00

FOREIGN PATENT DOCUMENTS

CN 222978027 U 6/2025

* cited by examiner

*Primary Examiner* — Erin Kryukova
(74) *Attorney, Agent, or Firm* — FIDELI LAW PLLC

(57) ABSTRACT

A firecracker-shaped light string is provided, which relates to a light string technology. A key point of a technical solution is that the firecracker-shaped light string includes a controller for receiving an electric power signal from a power plug and controlling a working state of the firecracker-shaped light string, the power plug connected to the controller, and a triple-wire sheathed light string and three main light strings that are electrically connected to the controller. The three main light strings are enwound into a twisted main body. Each main light string includes a lead wire and equidistant LEDs vertically mounted along the lead wire, and the LEDs on the three twisted main light strings are spaced at equal distances, thus forming a structure of the firecracker-shaped light string.

8 Claims, 1 Drawing Sheet

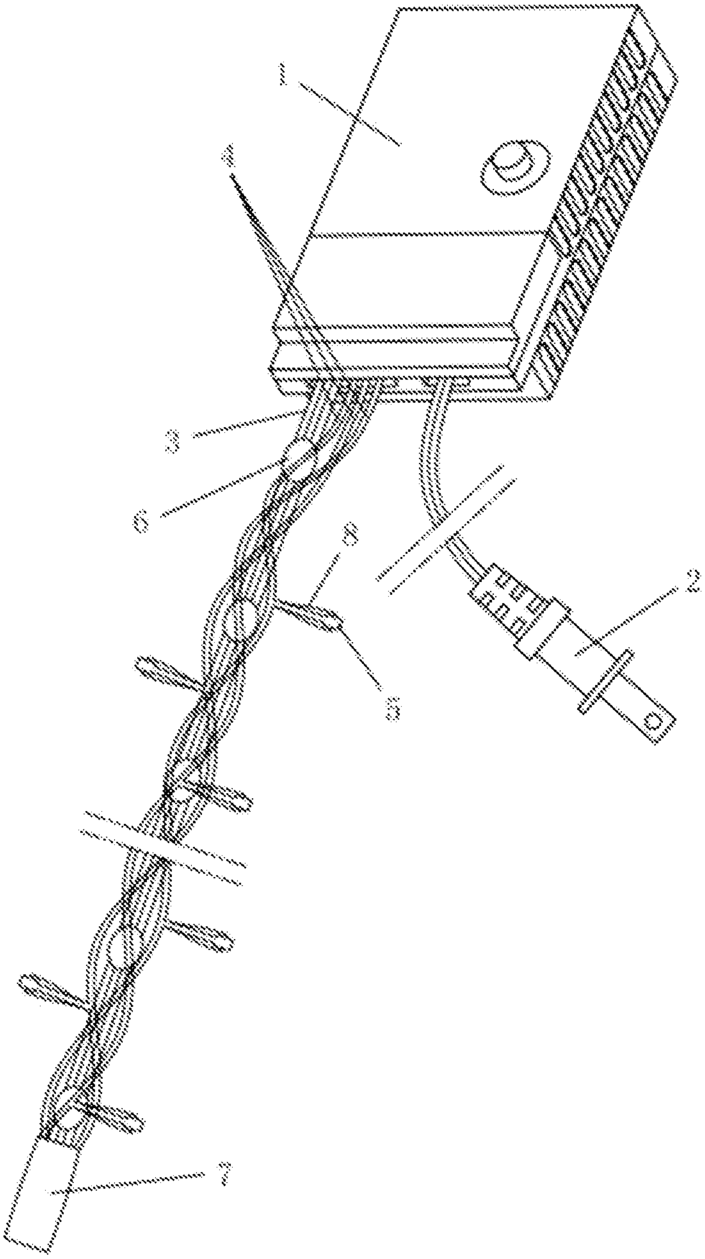
1
4
3
6
8
2
5
7

FIRECRACKER-SHAPED LIGHT STRING

RELATED APPLICATIONS

The present patent document claims the benefit of priority to Patent Application No. 202520979644.3, filed May 19, 2025, and entitled "FIRECRACKER-SHAPED LIGHT STRING," the entire contents of each of which are incorporated herein by reference.

BACKGROUND

1. Technical Field

The present disclosure relates to a light string technology, and in particular, to a firecracker-shaped light string.

2. Background Information

Most traditional light string products are linear light-emitting diode (LED) strings. They lack a unique shape and a decorative effect. Especially in festive and celebratory occasions, the traditional light string devices usually cannot meet demands for a visual effect and a decorative effect. Therefore, how to design a light string device that has a unique style and a good decorative effect has become a problem needing to be solved urgently in the market. In some light string designs in the existing art, attempts have been made to achieve a decorative effect through different arrangement modes, but shape and lighting combination still does not achieve an ideal effect.

BRIEF SUMMARY

For the shortcomings in the prior art, the present disclosure aims to provide a firecracker-shaped light string.

To achieve the above objective, the present disclosure provides the following technical solution: A firecracker-shaped light string includes a controller for receiving an electric power signal from a power plug and controlling a working state of the firecracker-shaped light string, the power plug connected to the controller, and a triple-wire sheathed light string and three main light strings that are electrically connected to the controller. The three main light strings are enwound into a twisted main body. Each main light string includes a lead wire and equidistant LEDs vertically mounted along the lead wire, and the LEDs on the three twisted main light strings are spaced at equal distances, thus forming a structure of the firecracker-shaped light string. The triple-wire sheathed light string is enwound in gaps of the main light strings and includes three independent lines, and mini LEDs that are spaced apart on the three independent lines.

In a further setting of the present disclosure, a head end of the triple-wire sheathed light string and head ends of the three main light strings are connected to the controller, and a tail end of the triple-wire sheathed light string and tail ends of the three main light strings are fixedly connected through a sheath, to prevent dispersion of the firecracker-shaped light string.

In a further setting of the present disclosure, light-emitting directions of adjacent LEDs on the three main light strings that are enwound are staggered in 120°, to form a stereoscopic light-emitting effect.

In a further setting of the present disclosure, the triple-wire sheathed light string is matched with the three main light strings in length, and the triple-wire sheathed light string and the three main light strings are designed to be flexible materials, facilitating adjustment and bending according to a mounting requirement. The triple-wire sheathed light string and the three main light strings are mechanically interlocked when enwound.

In a further setting of the present disclosure, a waterproof structure is arranged at a joint between the lead wire and each LED of each of the three main light strings. The waterproof structure includes a silicone sleeve and an epoxy resin sealant.

In a further setting of the present disclosure, a distance between the mini LEDs is 3 to 5 cm; and a distance between adjacent LEDs on each of the three main light strings is 5 to 8 cm.

In a further setting of the present disclosure, each of the three main light strings can work independently, and can adjust a working mode, including but not limited to a normally on mode and a flickering mode, of each light string according to a need.

In a further setting of the present disclosure, an enwinding ratio of the triple-wire sheathed light string to the three main light strings is 1:3, and an enwinding tension is 0.5 to 0.8 N.

Beneficial effects of the present disclosure are as follows:

1. Compared with the existing art, the firecracker-shaped light string of the present disclosure achieves a multi-dimensional stereoscopic lighting effect through an enwound structure of the three main light strings. First, the three main light strings are twisted. Compared with a traditional single-wire light string, the present disclosure can form a cylindrical illuminant with a diameter of 3 to 5 cm. This effectively increases a volume of the light string and enhances a sense of presence. Secondly, the spaced enwinding design of the triple-wire sheathed light string fills up physical gaps between the main light strings. Through supplementary lighting of the mini LEDs, the brightness uniformity of the entire light string is improved by 40% or above. After enwinding and forming, a stable spacing ratio is formed for a distance between the LEDs through mechanical interlocking, to ensure that visible light coverage rate in all angles can reach 90% or above. This composite structure ensures that a single light string can achieve a visual effect that is achieved by arranging a plurality of light strings side by side, so that the material costs are reduced by 30%. In addition, a triple-wire parallel structure averagely distributes current charges, so that a temperature rise is reduced by 15° C. when compared with that of a single-wire structure. This significantly improves electrical safety.

2. In the present disclosure, first, the head end of the triple-wire sheathed light string and the head ends of the three main light strings are connected to the controller, so that this can effectively and intensively control working states of all the light strings. The entire firecracker-shaped light string is more harmonious, and a problem of a failure in synchronous control in the traditional light string is avoided. In addition, by using the controller, turning on, turning off, flickering, and another effect of the light string can be adjusted according to a predetermined program, so that it brings higher adjustability and interactivity, and enhances a user experience. Second, the tail end of the triple-wire sheathed light string and the tail ends of the three main light strings are fixedly connected through the sheath, so that dispersion of the firecracker-shaped light string during use can be effectively prevented. The design of the sheath improves stability of the light string, prevents problems of looseness, breakage, and the like during hanging or placement of the light string, and can further protect electric wires and bulbs to an extent and prolong the service lives of the electric wires and the bulbs. This fixing mode avoids a risk of poor contact or short circuit of the light string due to looseness of the tail ends and improves safety of use. The firecracker-shaped light string of the present disclosure has good stability, safety, and adjustability and can provide a more durable and good use experience.

3. In the present disclosure, by precisely calculated staggered arrangement, when a light-emitting angle of a single LED is 120°, an overall coverage angle can reach 320°. According to actual measurement, this structure has an illumination uniformity index that is a double of that of the traditional structure. The light-emitting directions of the adjacent LEDs are staggered, so that a richer sense of layering and stereo perception can be generated by light in a space. Light beams in different directions are staggered from each other, which increases visual impact, makes the light string have a more uniform lighting effect, and avoids the shortcomings of monotonous and two-dimensional lighting of the traditional light string. In addition, this design effectively enhances a diffusion effect of a light source, can achieve uniform illumination within a wider range, and is particularly applicable to occasions requiring large-area illumination or decoration.

4. The firecracker-shaped light string has a simple and proper structure, is convenient to manufacture and easy and convenient to operate, avoids the shortcomings in the existing art, and is applicable to popularization, implementation, and application.

BRIEF DESCRIPTION OF THE DRAWINGS

FIG. 1 is a structural diagram of a firecracker-shaped light string according to the present disclosure.

Numerals in the drawings: 1: controller; 2: power plug; 3: triple-wire sheathed light string; 4: main light string; 5: LED; 6: mini LED; 7: sheath; and 8: silicone sleeve.

DETAILED DESCRIPTION OF THE DRAWINGS AND THE PRESENTLY PREFERRED EMBODIMENTS

Referring to FIG. 1, a further description is made to an embodiment of a firecracker-shaped light string according to the present disclosure.

For ease of explanation, spatial relative terms such as “up”, “down”, “left”, and “right” are used in the embodiments to illustrate a relationship between one element or feature shown in the figures and another element or feature. It should be understood that in addition to the orientations shown in the FIGURES, the spatial terms are intended to include different orientations of a device during use or operation. For example, if the device in the FIGURES is placed upside down, an element described as being located “below” another element or feature will be positioned as being “above” the another element or feature. Therefore, the exemplary term “down” can include both up and down orientations. The device can be positioned in other ways (rotated 90 degrees or in other orientations), and the spatial relative explanations used here can be explained correspondingly.

Moreover, relational terms such as “first” and “second” are only used to distinguish one component from another with the same name, without necessarily requiring or implying any actual relationship or order between these components.

As shown in FIG. 1, a firecracker-shaped light string includes a controller 1 for receiving an electric power signal from a power plug 2 and controlling a working state of the firecracker-shaped light string, the power plug 2 connected to the controller 1, and a triple-wire sheathed light string 3 and three main light strings 4 that are electrically connected to the controller 1. The three main light strings 4 are enwound into a twisted main body. Each main light string 4 includes a lead wire and equidistant LEDs 5 vertically mounted along the lead wire, and the LEDs 5 on the three twisted main light strings 4 are spaced at equal distances, thus forming a structure of the firecracker-shaped light string. The triple-wire sheathed light string 3 is enwound in gaps of the main light strings 4 and includes three independent lines, and mini LEDs 6 that are spaced apart on the three independent lines.

A multi-dimensional stereoscopic lighting effect is achieved through an enwound structure of the three main light strings 4. First, the three main light strings 4 are twisted. Compared with a traditional single-wire light string, the present disclosure can form a cylindrical illuminant with a diameter of 3 to 5 cm. This effectively increases a volume of the light string and enhances a sense of presence. Secondly, the spaced enwinding design of the triple-wire sheathed light string 3 fills up physical gaps between the main light strings 4. Through supplementary lighting of the mini LEDs 6, the brightness uniformity of the entire light string is improved by 40% or above. After enwinding and forming, a stable spacing ratio is formed for a distance between the LEDs 5 through mechanical interlocking, to ensure that visible light coverage rate in all angles can reach 90% or above. This composite structure ensures that a single light string can achieve a visual effect that is achieved by arranging a plurality of light strings side by side, so that the material costs are reduced by 30%. In addition, a triple-wire parallel structure averagely distributes current charges, so that a temperature rise is reduced by 15° C. when compared with that of a single-wire structure. This significantly improves electrical safety.

A head end of the triple-wire sheathed light string 3 and head ends of the three main light strings 4 are connected to the controller 1, and a tail end of the triple-wire sheathed light string and tail ends of the three main light strings are fixedly connected through a sheath 7, to prevent dispersion of the firecracker-shaped light string.

First, the head end of the triple-wire sheathed light string 3 and the head ends of the three main light strings 4 are connected to the controller 1, so that this can effectively and intensively control working states of all the light strings. The entire firecracker-shaped light string is more harmonious, and a problem of a failure in synchronous control in the traditional light string is avoided. In addition, by using the controller 1, turning on, turning off, flickering, and another effect of the light string can be adjusted according to a predetermined program, so that it brings higher adjustability and interactivity, and enhances a user experience. Second, the tail end of the triple-wire sheathed light string and the tail ends of the three main light strings are fixedly connected through the sheath 7, so that dispersion of the firecracker-shaped light string during use can be effectively prevented. The design of the sheath 7 improves stability of the light string, prevents problems of looseness, breakage, and the like during hanging or placement of the light string, and can further protect electric wires and bulbs to an extent and prolong the service lives of the electric wires and the bulbs. This fixing mode avoids a risk of poor contact or short circuit of the light string due to looseness of the tail ends and improves safety of use. The firecracker-shaped light string of the present disclosure has good stability, safety, and adjustability and can provide a more durable and good use experience.

Light-emitting directions of adjacent LEDs 5 on the three main light strings 4 that are enwound are staggered in 120°, to form a stereoscopic light-emitting effect.

By precisely calculated staggered arrangement, when a light-emitting angle of a single LED 5 is 120°, an overall coverage angle can reach 320°. According to actual measurement, this structure has an illumination uniformity index that is a double of that of the traditional structure. The light-emitting directions of the adjacent LEDs 5 are staggered, so that a richer sense of layering and stereo perception can be generated by light in a space. Light beams in different directions are staggered from each other, which increases visual impact, makes the light string have a more uniform lighting effect, and avoids the shortcomings of monotonous and two-dimensional lighting of the traditional light string. In addition, this design effectively enhances a diffusion effect of a light source, can achieve uniform illumination within a wider range, and is particularly applicable to occasions requiring large-area illumination or decoration.

The triple-wire sheathed light string 3 is matched with the three main light strings 4 in length, and the triple-wire sheathed light string 3 and the three main light strings 4 are designed to be flexible materials, facilitating adjustment and bending according to a mounting requirement. The triple-wire sheathed light string 3 and the three main light strings 4 are mechanically interlocked when enwound.

The triple-wire sheathed light string 3 is matched with the three main light strings 4 in length, and are designed to be the flexible materials, facilitating adjustment and bending according to the mounting requirement. The biggest advantage of this design is that the product can be flexibly applied to different mounting environments and space structures. In actual application, a user often needs to adjust the layout of the light string according to different environments. Particularly, when a complicated shape is bent, hung, or arranged, a flexible material can provide a great convenience. Since the triple-wire sheathed light string 3 is matched with the three main light strings 4 in length, a joint problem caused by unmatching lengths can be effectively avoided, thereby ensuring stability and beauty of the entire light string. In addition, the triple-wire sheathed light string 3 and the three main light strings 4 form a mechanically interlocked structure when enwound, so that this further improves the overall stability of the light string, and avoids looseness or dropping of the light string during use. This design greatly improves safety and reliability of use. Meanwhile, it is easier and more efficient to mount the light string, and this meets requirements of various festive and decorative occasions.

A waterproof structure is arranged at a joint between the lead wire and each LED 5 of each of the three main light strings 4. The waterproof structure includes a silicone sleeve 8 and an epoxy resin sealant.

This can effectively protect the light string from being damaged in a wet environment or by water. The light string is often used in an outdoor environment. Particularly, in a festive or decorative activity, the light string may be exposed to rainwater, dew, or another wet condition. The waterproof design can effectively prevent water from seeping into the joints between the LEDs 5 and the lead wires, thus avoiding problems of short circuit, corrosion, and the like, and prolonging the service life of the light string. In addition, the silicone sleeve 8 and the epoxy resin sealant have excellent waterproof performance and durability, can provide long-term protection for electrical connections, and ensure stable operation of the light string in various environments. This waterproof structure improves reliability of use of the light string, further ensures the safety in outdoor or wet places, and is suitable for meeting usage requirements under various severe weather conditions.

A distance between the mini LEDs 6 is 3 to 5 cm; and a distance between adjacent LEDs 5 on each of the three main light strings 4 is 5 to 8 cm.

Due to the small distances between the mini LEDs 6, light sources can be denser, thus forming a uniform brightness distribution, enhancing an overall light-emitting effect of the light string, and being applicable to occasions requiring high brightness and uniform illumination. Meanwhile, due to the design of the distance between the adjacent LEDs 5 on each main light string 4, a situation of non-uniform light distribution or insufficient brightness caused by a large distance is avoided, so that the overall light string has a more hierarchical visual effect. Thanks to the proper distance between the LEDs 5, a bright lighting effect can be provided, a richer light and shadow effect can be generated in the space, and a festival atmosphere or a decorative effect can be enhanced.

Each of the three main light strings 4 can work independently, and can adjust a working mode, including but not limited to a normally on mode and a flickering mode, of each light string according to a need.

High flexibility and adaptability are provided. A user can adjust the working mode of the light string according to different occasion requirements. For example, the flickering mode is selected in festival celebration to create a dynamic atmosphere. In other occasions, the normally on mode is selected to provide a continuous lighting effect. In addition, thanks to the independent working design, each main light string 4 can be controlled independently. A user can separately set the light strings according to specific requirements, without being limited by the overall layout, so that convenience of use and functionality of the light string are improved. The light strings need to be adjusted to different working modes during decoration and lighting and in different activity scenes, to bring a richer visual experience and a more flexible use mode. This design greatly expands the scope of application of the light string, making the light string meet usage requirements of more occasions and improving the market competitiveness of the light string.

An enwinding ratio of the triple-wire sheathed light string 3 to the three main light strings 4 is 1:3, and an enwinding tension is 0.5 to 0.8 N.

The precise control of the enwinding ratio and the enwinding tension can ensure stability and uniformity of the light string. The enwinding ratio of the triple-wire sheathed light string 3 to the three main light strings 4 is designed to 1:3, so that the light string has a more appropriate overall structure, and can keep balance during use and avoid excessive bending or torsion. Meanwhile, the control of the tension can ensure that the light string does not have looseness or non-uniform stretching during mounting and use, thus improving stability and durability of the light string. The moderate tension can also avoid excessive pulling on the LEDs 5 or the lead wires, so that a risk of damage is lowered, and it ensures safety and stability of the light string after long-time use. This proper enwinding ratio and enwinding tension design make the light string more beautiful, greatly improves the durability and reliability of the light string, and enhances the overall use experience.

The above-mentioned embodiments are only preferred embodiments of the present disclosure and are not intended to limit the present disclosure, and the usual changes and substitutions made by those skilled in the art within the scopes of the technical solutions of the present disclosure shall fall within the protection scope of the present disclosure.

The invention claimed is:

1. A firecracker-shaped light string, comprising a controller (1) for receiving an electric power signal from a power plug (2) and controlling a working state of the firecracker-shaped light string, the power plug (2) connected to the controller (1), and a triple-wire sheathed light string (3) and three main light strings (4) that are electrically connected to the controller (1), wherein the three main light strings (4) are enwound into a twisted main body; each main light string (4) comprises a lead wire and equidistant LEDs (5) vertically mounted along the lead wire, and the LEDs (5) on the three twisted main light strings (4) are spaced at equal distances, thus forming a structure of the firecracker-shaped light string; the triple-wire sheathed light string (3) is enwound in gaps of the main light strings (4) and comprises three independent lines, and mini LEDs (6) that are spaced apart on the three independent lines.

2. The firecracker-shaped light string according to claim 1, wherein a head end of the triple-wire sheathed light string (3) and head ends of the three main light strings (4) are connected to the controller (1), and a tail end of the triple-wire sheathed light string (3) and tail ends of the three main light strings (4) are fixedly connected through a sheath (7), to prevent dispersion of the firecracker-shaped light string.

3. The firecracker-shaped light string according to claim 1, wherein light-emitting directions of adjacent LEDs (5) on the three main light strings (4) that are enwound are staggered in 120°, to form a stereoscopic light-emitting effect.

4. The firecracker-shaped light string according to claim 1, wherein the triple-wire sheathed light string (3) is matched with the three main light strings (4) in length, and the triple-wire sheathed light string (3) and the three main light strings (4) are designed to be flexible materials, facilitating adjustment and bending according to a mounting requirement; and the triple-wire sheathed light string (3) and the three main light strings (4) are mechanically interlocked when enwound.

5. The firecracker-shaped light string according to claim 1, wherein a waterproof structure is arranged at a joint between the lead wire and each LED (5) of each of the three main light strings (4); and the waterproof structure comprises a silicone sleeve (8) and an epoxy resin sealant.

6. The firecracker-shaped light string according to claim 1, wherein a distance between the mini LEDs (6) is 3 to 5 cm; and a distance between adjacent LEDs (5) on each of the three main light strings (4) is 5 to 8 cm.

7. The firecracker-shaped light string according to claim 1, wherein each of the three main light strings (4) works independently, and is able to adjust a working mode, comprising but not limited to, a normally on mode and a flickering mode, of each light string according to a need.

8. The firecracker-shaped light string according to claim 1, wherein an enwinding ratio of the triple-wire sheathed light string (3) to the three main light strings (4) is 1:3, and an enwinding tension is 0.5 to 0.8 N.

* * * * *